United States Patent [19]

Dakin et al.

[11] Patent Number: 4,499,502
[45] Date of Patent: Feb. 12, 1985

[54] COMPRESSED BANDWIDTH FREQUENCY MODULATION SIGNAL FORMAT APPARATUS AND METHOD

[75] Inventors: Wayne R. Dakin, Huntington Beach; Jordan Isailovic, Fountain Valley, both of Calif.

[73] Assignee: Discovision Associates, Costa Mesa, Calif.

[21] Appl. No.: 397,309

[22] Filed: Jul. 12, 1982

[51] Int. Cl.³ .............................................. H04N 9/491
[52] U.S. Cl. ...................................... 358/310; 358/12
[58] Field of Search ................................. 358/310, 12

[56] References Cited

U.S. PATENT DOCUMENTS

| | | |
|---|---|---|
| 3,764,739 | 10/1973 | Faroudja . |
| 3,893,163 | 7/1975 | Wessels et al. . |
| 3,969,756 | 7/1976 | Palmer et al. . |
| 3,972,064 | 7/1976 | Keizer . |
| 4,090,214 | 5/1978 | Wright . |
| 4,223,349 | 9/1980 | Dakin et al. . |
| 4,225,873 | 9/1980 | Winslow . |

FOREIGN PATENT DOCUMENTS

| | | |
|---|---|---|
| 1902740 | 8/1970 | Fed. Rep. of Germany . |
| 3149324 | 6/1982 | Fed. Rep. of Germany . |

Primary Examiner—Richard Murray
Attorney, Agent, or Firm—Ronald J. Clark

[57] ABSTRACT

A method and apparatus for developing a compressed bandwidth frequency modulation signal format to increase the playing time per side of a videodisc by compressing the signal bandwidth of the recorded information preferably by a factor of two. Method and apparatus are described and shown for modulating a carrier signal with a color video signal, modulating a subcarrier frequency with at least one audio frequency signal, selecting the carrier and subcarrier frequencies such that the upper frequency deviation limit of the frequency modulated carrier signal is lower than the useful upper frequency limit of the recording medium chosen for the disc, and such that there is no overlap of the chroma baseband signal and the second order chroma sideband. At least one audio subcarrier frequency is located between the first order chroma sideband and the chroma baseband signal, or between the chroma baseband signal and the second order chroma sideband, or between the second order chroma sideband and DC. Preferably, the maximum FM carrier frequency, the blanking level FM carrier frequency, the white level FM carrier frequency, and the horizontal sync tip FM carrier frequency are all one-half the respective frequencies of a full-luminance/full-color carrier signal.

20 Claims, 10 Drawing Figures

COMPRESSED BANDWIDTH FREQUENCY MODULATION SIGNAL FORMAT APPARATUS AND METHOD

BACKGROUND OF THE INVENTION

1. Field of the Invention

The present invention relates to a method and apparatus for developing a compressed bandwidth frequency modulation signal format, and more particularly relates to a method and apparatus for increasing the playing time per side of a videodisc by compressing the signal bandwidth of the recorded information preferably by a factor of two. Method and apparatus are described and shown for modulating carrier and subcarrier frequencies with video and audio information and for selecting the carrier and subcarrier frequencies such that the resultant frequency components are arranged throughout the frequency spectrum to optimize the information storage capability of the recording medium with minimal degradation of quality of the reproduced program.

2. Brief Description of the Prior Art

The present invention concerns the signal formatting of a frequency modulated carrier containing composite video information, including chroma information and at least one audio channel of information. Although the invention can be applied to broadcast transmission systems as well, the following description will be concerned with applying the inventive concepts to the recording and playback processes of a videodisc system, and it will be appreciated that such limited scope of description is for the purpose of convenience in describing the development of a signal format and that the invention is equally applicable to line signal transmissive systems, video tape recording systems, and broadcast transmission systems.

For the same reason of convenience as indicated in the previous paragraph, the prior art of concern will relate to frequency modulation signal format processing, and particularly such processing as used in connection with the recording onto a recording medium and the playing back from the recording medium of an audio/video program.

An example of a recording medium with which the present invention has great applicability is the optical disc. An optical disc is a clear plastic disc approximately the size of an LP phonograph record, which has an information carrying surface embedded in its interior beneath a clear exterior surface. Such information carrying surface has a relatively uniform optical property which is altered along a path in a prescribed manner so as to impart informational content to the surface which can then be "read" by way of a beam of light imaged onto the surface. For example, a uniformly reflective surface may be provided and small indicia, such as small pits, having altered reflective properties from that of the remainder of the surface may be arranged sequentially in circular or spiralling tracks. The disc is read by imaging a beam of light onto a track and causing the disc to rotate so that the spot of light scans along the track. The light which is reflected off of the surface is detected by a photodetector which produces an electrical signal in response to the sensing of light. Variations in the intensity of the reflected light due to the alternate presence or absence of the indicia cause variations in the electrical signal. These variations in the electrical signal represent the information stored on the disc.

Information is stored on the disc in the form of variations in the spatial frequency of the indicia in the track, and also in "duty cycle" variations, that is, variations in the relative length of the indicia as compared with the "land" of reflective surface between them. When read by a beam of light and photodetector, as described above, the spatial frequency and duty cycle variations of the indicia cause time/frequency variations and time/duty cycle variations of the detected electrical signal.

U.S. Pat. No. 3,893,163 ("the 163 patent") which was issued July 1, 1975, discloses a method of recording a video signal onto a recording medium, such as a disc, according to which the luminance and chrominance signals are separated from one another prior to recording. The luminance information is then used to frequency modulate a carrier while the chrominance information is used to modulate a subcarrier. The frequency modulated carrier and subcarrier are linearly summed, resulting in "duty cycle" modulation of the carrier by the subcarrier at the zero crossing points of the carrier. That is, the length of the positive half of the signal cycle may be modulated with respect to the length of the negative half of the cycle. The zero crossings of the composite signal are detected and used to generate a square wave of constant amplitude. This square wave signal may be used to generate the indicia on an optical disc such that the luminance information is contained in the spatial frequency variation of the recorded indicia, and the chrominance information is contained in the duty cycle variation of the recorded indicia. Also disclosed in the U.S. Pat. No. 3,893,163 is the technique of summing a frequency modulated sound subcarrier with the modulated chrominance subcarrier and luminance carrier prior to detecting the zero crossings of the composite signal to generate the aforementioned square wave signal.

While the method described in the U.S. Pat. No. 3,893,163 has the advantage of providing a technique for recording color video information and audio information onto an amplitude insensitive recording medium such as an optical disc, it has the disadvantage of requiring that the chrominance information be totally separated from the luminance information in the frequency spectrum.

Another technique, described in an article entitled "System Coding Parameters, Mecha cs and Electro-Mechanics of the Reflective Videodi Player", by P. W. Bogels and N. V. Philips, presen d at the IEEE 17th Chicago Spring Conference on Consumer Electronics, June 8, 1976, has been used successfully in commercial applications. This technique, as reported by Bogels, involves frequency modulating a carrier signal with a standard NTSC color video signal, and then modulating the zero crossings of the resultant FM signal with a frequency modulated audio subcarrier in a manner similar to the duty cycle modulation disclosed in the U.S. Pat. No. 3,893,163.

One problem encountered in recording information on an optical disc, using any method, is fitting the information on the discs within the bandwidth limit of the disc. Optical discs made commercially for video recording and playback have an upper cutoff frequency of about 13 mHz at the inner radius. Fitting luminance, chrominance and audio signals onto such a bandwidth limited medium requires care to ensure that sidebands and intermodulation products do not interfere with signal recovery.

A successful format for optical discs which has been implemented with the modulation technique described above according to the Bogels article involves the provision of a video carrier signal frequency modulated with a composite video signal such that a carrier frequency of approximately 8.1 mHz corresponds to blanking level, sync tips correspond to approximately 7.6 mHz, and full white corresponds to approximately 9.3 mHz. Two separate frequency modulated audio subcarriers are positioned in the spectrum at approximately 2.3 mHz and 2.8 mHz. This format is described in some detail in the Bogels article. The format described by Bogels is presently the standard format used in high quality consumer and industrial players and discs of the optical type, and will be referred to hereinafter as a full-luminance/full-color signal format.

For a number of years the full-luminance/full-color signal format has been considered to be the optimum arrangement for recording high quality audio and video information on commercial optical videodiscs. Furthermore, while the aforementioned format yields high quality optical videodisc recordings, an improved method of recording audio and video information onto a recording medium having a limited bandwidth with minimal interfering effect of intermodulation products and improved suppression of second order intermodulation products from an audio subcarrier and video carrier can be found by reference to U.S. patent application Ser. No. 316,015 filed Oct. 28, 1981 and entitled "IMPROVED AUDIO/VIDEO SIGNAL RECORDING METHOD", assigned to the assignee of the present invention.

Another variation of signal format developed specifically for recording on a videodisc can be found in U.S. Pat. No. 3,969,756 to Palmer et al.

The Palmer et al patent relates generally to a disc record structure permitting high density storage of related luminance, chrominance, and multi-channel sound information and to the recording apparatus and methods for recording and playing back such related information. The Palmer et al system was created so as to be able to fit all of the luminance, chrominance, and sound information onto the videodisc structure within the confines of the inherent practical limitations in the recording process as to the highest instantaneous frequency readily recordable on the chosen medium. The medium of concern in the Palmer et al patent is of the variable capacitance form, wherein an information track incorporates geometric variations in the bottom of a spiral groove on a disc, the surface of which comprises conductive material covered with a thin coating of dielectric material. Variations in the capacitance presented between a conductive electrode on a tracking stylus and the conductive material of the disc occur as the disc is rotated by a supporting turntable, and the capacitance variations are sensed to recover the recorded information. However, the relatively high frequency location of the color subcarrier and its sidebands in the NTSC format would, when using the band limited system of Palmer, et al leads to unacceptable playback signal quality. Additionally, serious problems develop with undesirable beats when using the unmodified NTSC format with its high frequency location for color information.

Accordingly, the Palmer et al system was structured to sacrifice picture detail, luminance detail, and some signal-to-noise ratio figures in exchange for a functional and relatively adequate frequency spectrum packing density for the various intelligence information signal elements. As a result, a reasonable color picture with accompanying two-channel audio programming can be recorded and played back with reasonably good fidelity and limit the upper range of the frequency carrier deviation to the still rather high figure of 6.3 mHz (peak white representative).

SUMMARY OF THE INVENTION

The present invention relates to a method and apparatus for generating a compressed bandwidth frequency modulation carrier signal with frequency spectrum components chosen to minimize interference between audio and color sideband components, provide a reasonably high quality picture and sound program through recording and playback processes, and yet restrict the upper picture carrier frequency deviation limit to less than that of the aforementioned Palmer et al U.S. Patent. The method is particularly useful in recording video and audio information onto a recording medium that may be insensitive to the variations in the amplitude of the recorded information and is intended to have its greatest use in the recording of color video information and accompanying audio information onto optical discs.

As opposed to the reasoning behind the Palmer et al signal format development, optical discs with which the present invention is primarily concerned are not inhibited by practical limitations in the recording process, since the highest instantaneous frequency recordable on an optical disc can well accommodate the relatively high frequency location of the color subcarrier and its sidebands in the NTSC format and yet allow a generous frequency deviation range in the frequency spectrum along with long playing time for the disc. This is evident by the previously mentioned values of frequency deviation values of between 7.6 mHz and 9.3 mHz as is presently being employed in modern day videodisc players and discs of the optical type.

However, there exists an economic need to increase the playing time per side of a videodisc especially for consumer applications.

Early videodiscs were recorded with a single picture frame occupying a track having a complete revolution on the disc surface. Accordingly, vertical intervals were aligned along a common radius, and the disc was both recorded and played back at a constant angular velocity (CAV). To increase the playing time of a disc, the rotational speed of the disc can be decreased as the read head radius increases such that information is recorded and played back at a constant linear velocity (CLV). Modern long playing discs are recorded in the CLV mode. Presently, a videodisc structured to have its informational content readable in a constant angular velocity mode (CAV mode) has a playing time per side of one-half hour. The constant linear velocity mode (CLV mode) of program formatting on the disc presently provides one hour of program material per disc side. With movies longer than two hours, it can be appreciated that the user would have to purchase two discs in order to be able to play out the entire movie. Many lectures, demonstrations, training programs, and user interactive programs are of a nature to demand the use of still framing and frame search capabilities available only on CAV discs. Furthermore, they are frequently of a length beyond one hour and less than two hours as has been determined by the tolerance levels (e.g. attention span) of observers of such programs. The present invention thus has for its primary goal the generation of a compressed bandwidth frequency modulation carrier signal which minimizes interference between audio and chrominance signals, maintains a relatively high overall signal-to-noise ratio, and additionally produces reasonable quality picture and sound while extending the playing time of a CAV disc to one hour and a CLV disc to two hours per side. It can be appreciated that merely arbitrarily choosing frequency spectrum locations, subcarrier frequencies, bandwidth limitations, etc. cannot produce acceptable picture quality and noise figures, and it is an object of this invention to show and describe a method and apparatus for judiciously selecting the proper parameters which will produce an optimum balance between sound, picture, and color quality as compared with signal-to-noise ratio and frequency spectrum distributions.

In its broader aspects, the present invention concerns a method and apparatus for modulating a carrier signal with a color video signal, modulating a subcarrier frequency with at least one audio frequency signal, selecting the carrier and subcarrier frequencies such that the upper frequency deviation limit of the frequency modulated carrier signal is lower than the useful upper frequency limit of the recording medium, and such that there is no overlap of the chroma baseband signal and the second order chroma sideband.

In a preferred form of the invention, and in addition to the characteristics noted in the previous paragraph, the frequency deviation spectrum location for the maximum FM carrier frequency, the white level FM carrier frequency, the blanking level carrier frequency, and the horizontal sync tip FM carrier frequency are all one half the corresponding frequencies of a full-luminance/full-color carrier signal, thus yielding a doubling of the playing time for the same spatial frequency on the disc.

An alternate broad aspect of the invention concerns a method and apparatus for modulating a carrier signal with a color video signal, modulating a subcarrier frequency with an audio frequency signal, selecting the carrier and subcarrier frequencies such that the upper frequency deviation limit of the frequency modulated carrier signal is lower than the useful upper frequency limit of the recording medium, and such that at least one audio subcarrier frequency is located between the first order chroma sideband and the chroma baseband signal, or between the chroma baseband signal and the second order chroma sideband, or between the second order chroma sideband and DC. Preferably, the maximum FM carrier frequency, the blanking level FM carrier frequency, the white level FM carrier frequency, and the horizontal sync tip FM carrier frequency are all one half the respective frequencies of a full-luminance/full-color carrier signal.

In the following text, reference will be made to various parameters defined in the following glossary of terms:

| | |
|---|---|
| $B_{L1}$ | Luminance Bandwidth, Standard Play |
| $B_{L2}$ | Luminance Bandwidth, Extended Play |
| $f_{max1}$ | Maximum FM Carrier Frequency, Standard Play |
| $f_{max2}$ | Maximum FM Carrier Frequency, Extended Play |
| $f_{w1}$ | White Level FM Carrier Frequency, Standard Play |
| $f_{w2}$ | White Level FM Carrier Frequency, Extended Play |
| $f_{b1}$ | Blanking Level FM Carrier Frequency, Standard Play |
| $f_{b2}$ | Blanking Level FM Carrier Frequency, Extended Play |
| $f_{s1}$ | Horizontal Sync Tip FM Carrier Frequency, Standard Play |
| $f_{s2}$ | Horizontal Sync Tip FM Carrier Frequency, Extended Play |
| $B_{CH1}$ | Chrominance Bandwidth, Standard Play |
| $B_{CH2}$ | Chrominance Bandwidth, Extended Play |
| $B_{CHF}$ | Chrominance Bandwidth of Bandpass Filter on Playback |
| $B_{CHH}$ | Chrominance Bandpass of Hetrodyned Signal |
| $f_{SC1}$ | Color Subcarrier Frequency (NTSC) |
| $f_{SC2}$ | Color Subcarrier Frequency, Extended Play |
| $f_{SCref}$ | Color Subcarrier Hetrodyning Reference Frequency |
| $f_{a1}$ | 1st Audio Carrier Frequency, Extended Play |
| $f_{a2}$ | 2nd Audio Carrier Frequency, Extended Play |
| $f_{as1}$ | General Audio Carrier Frequency, Standard Play |
| $f_{as2}$ | General Audio Carrier Frequency, Extended Play |
| $f_H$ | Horizontal Line Frequency |
| $BP_2$ | Low Pass Filter Passband, Extended Play |
| $a_{CH}$ | Gain of Chrominance Amplifier |

In its narrower aspects, the luminance video component is derived from the NTSC standard full-luminance bandwidth value of 4.2 mHz, such that the compressed luminance bandwidth $B_{L2} = \frac{1}{2} B_{L1} = \frac{1}{2}$ (4.2 mHz) = 2.1 mHz. Similarly, deriving the frequency spectrum locations for the modulated video carrier signal from a full-luminance/full-color carrier signal wherein $f_{max1} = 11.3$ mHz and $f_{w1} = 9.3$ mHz and $f_{b1} = 8.1$ mHz and $f_{s1} = 7.6$ mHz produces the compressed bandwidth frequency spectral points (by applying a one half multiplication factor) of $f_{max2} = 5.65$ mHz and $f_{w2} = 4.65$ mHz and $f_{b2} = 4.05$ mHz and $f_{s2} = 3.81$ mHz, respectively.

In a preferred embodiment of the invention, a pair of audio subcarrier frequencies are selected to contain the information of a stereo or two-channel program. Preferably, a first or lower audio frequency subcarrier is selected to be between the second order chroma sideband and DC, while the second, or higher, audio frequency subcarrier is selected to lie between the chroma baseband signal and the second order chroma sideband. Applying the concepts of this invention to the preferred embodiment wherein a pair of audio channels is provided, and while meeting the above and other considerations to be described in detail later, produces a color subcarrier frequency of 1.739 mHz, a chrominance bandwidth of 0.286 mHz, a first audio subcarrier frequency of 0.578 mHz, and a second audio subcarrier frequency of 1.294 mHz. Finally, by using pre-emphasis processing of the video signal, the maximum frequency deviation is limited to 5.65 mHz, and since this and other FM spectral locations are one half the standard full-luminance/full-color carrier signal values, twice as much playing time can be recorded on a videodisc than when using the full-luminance/full-color signal format by merely reducing the rotational speed of the videodisc during recording and playback to one-half normal speed.

In this connection, in recording or reading a standard optical videodisc, the disc is caused to rotate typically at 1800 RPM beneath a read head which focuses a laser light beam onto the disc. As the disc rotates, the light beam is reflected or not from the surface depending upon whether a planar portion between bumps or a bump is encountered by the light beam as it traverses an information track on an embedded disc surface. As a result, the constant focussed light beam impinging upon the surface of the disc is reflected from the embedded disc information surface in the form of an interrupted reflected beam of light which can be sensed by a photodetector, amplified, demodulated, and observed and listened to on a standard television monitor or comparable equipment.

The bumps are arranged in track-like fashion along a substantially circular path on the disc surface. With the present day technology capable of recording 54,000 tracks on one (or each) side of a videodisc, a full half hour of program material can be recorded in standard NTSC format, that is when a single picture frame occupies a complete revolution of a disc, i.e. using a constant angular velocity (CAV) mode of recording. In a constant linear velocity (CLV) mode of recording, the same sized videodisc can carry programs up to one hour in length on each side. It can therefore be appreciated that applying the concepts of the present invention, and to reduce the rotational speed of the disc by one half and double the number of television frames (or fields) per revolution, permits a doubling of the playing time for the disc. It should be noted that, unlike the system according to the aforementioned Palmer et al patent, in a spatial analysis, even in the extended play mode, the present invention deposits (in record) and recovers (in playback) instantaneous signal changes represented on the disc by bumps of the same dimension and arranged along a track of the same pitch as a standard disc spinning at 1800 RPM with information recorded at frequencies up to 11.3 mHz. Thus, by incorporating the concepts of the present invention, an extended playing time for the videodisc is achieved by halving the maximum rotational speed of the disc and doubling the number of fields or frames per revolution at the sacrifice of some, but not significant, loss in video resolution.

The foregoing and other objects, features, and advantages of the invention will be apparent from the following more particular description of a preferred embodiment of the invention, as illustrated in the accompanying drawings.

DETAILED DESCRIPTION OF THE PREFERRED EMBODIMENT

Figure 1:
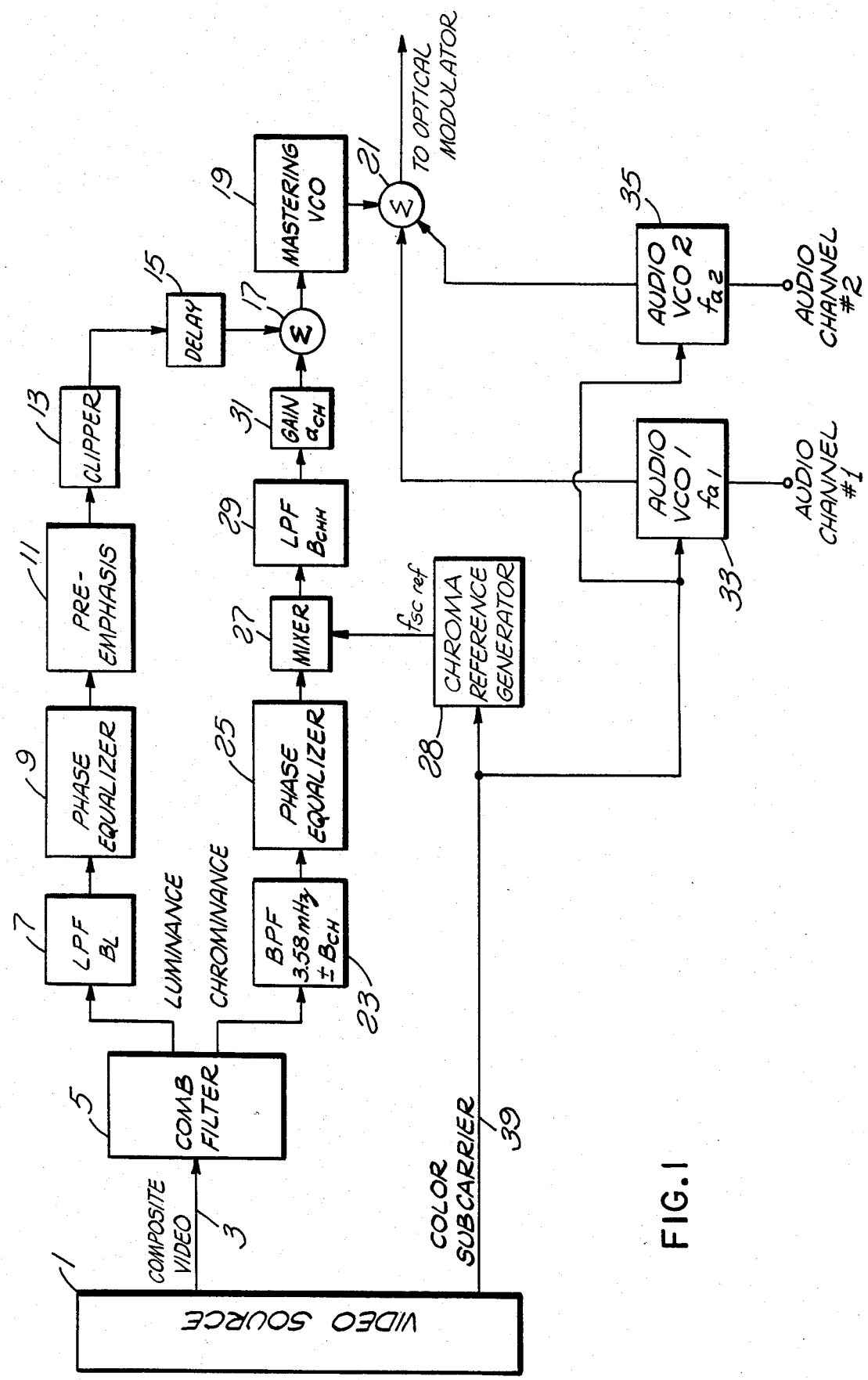
FIG. 1 is a block diagram of the record electronics incorporating the compressed bandwidth feature of the invention.

FIG. 1 shows, in block diagram form, the electronics necessary to process a video source signal in preparation for modulating an optical modulator in the manner known previously from, for example, U.S. Pat. No. 4,225,873 by John Winslow, issued Sept. 13, 1980, and assigned to the assignee of the present invention.

A composite video signal on input line 3 from video source 1 contains both luminance and chrominance information on a single signal line. After passing through comb filter 5, the luminance and chrominance information portions of the composite video signal have been separated (using known techniques), and the luminance portion of the signal is processed separately in the upper path shown in FIG. 1, while the chrominance portion of the composite video signal is processed through the lower signal path. The luminance signal passes through low pass filter 7 having a bandwidth $B_L$. The value of the luminance bandwidth will be determined later in this description by using the concepts underlying the present invention, such bandwidth being less than the NTSC specified value of 4.2 mHz.

The reduced bandwidth limited luminance signal passes from low pass filter 7 through phase equalizer 9 to permit selective equalization of the frequencies passed by the low pass filters 7 and 85 due to unequal phase shifting attributed to the different frequencies involved.

The phase equalized limited bandwidth luminance signal is then presented to the pre-emphasis network 11 for the purposes of controllably increasing the gain through the luminance channel for high frequency components in order to raise the important high frequency components to above a quiescent noise level. Of course, the pre-emphasis accomplished by block 11 purposely alters the luminance signal passing therethrough so as to require de-emphasis by the user before being routed to a video monitor. The de-emphasis circuit block in the player operates on the luminance signal in precisely the opposite fashion as does pre-emphasis block 11 in the recorder in order that the net result through the record/playback process faithfully reproduces the original luminance signal.

After pre-emphasis, a clipper 13 is employed to limit the amplitude of the luminance signal to a prescribed maximum limit point so as to ensure that the ultimate FM frequency limits, represented by the instantaneous amplitude of the luminance signal, do not exceed preset FM spectral frequencies.

Since separation of the luminance and chrominance signals in the recorder and player results in a delay in one channel different than that of the other, a delay circuit 15 is imposed in the luminance channel so as to match the delay of the chrominance signal passing through the lower path in FIG. 1 so as to become coincident, time-wise, at summation circuit 17. The summed luminance and chrominance signal then passes to mastering voltage control oscillator (VCO) 19 the output of which is a frequency modulated representation of the luminance and chrominance signal, summed in summing network 21 with the audio 1 and audio 2 modulated carrier signals and outputted in such combined form to the optical modulator of the recording device.

The chrominance signal summed in summing network 17 is stripped from the composite video signal on line 3 by comb filter 5 and sent to the chrominance bandpass filter 23 in a known manner. Bandpass filter 23 has a bandpass of $\pm B_{CH2}$. As with the luminance signal, the bandwidth $B_{CH}$ of the chrominance signal is limited to a value less than NTSC standards for the purposes of limiting the bandwidth of the FM spectrum at the modulator, i.e. to be compressed in form so as to allow longer playing time on a videodisc.

The limited bandwidth chrominance signal passes through phase equalizer 25 to be acted upon in a manner similar to that described in relation to the effect of phase equalizer 9 in the luminance signal.

After equalization, the chrominance signal, having a subcarrier frequency reference $f_{SC1} = 3.58$ mHz, passes to mixer 27 which, in combination with chroma reference generator 28 effects hetrodyning of the chrominance signal to produce a difference frequency product of modulation in the output of mixer 27. The chrominance signal with its new subcarrier frequency reference is passed through low pass filter 29 which permits faithful passage of the chrominance signal of bandwidth limited by bandpass filter 23. Low pass filter 29 accordingly has a bandwidth higher than the new subcarrier frequency $f_{sc2}$ plus $B_{CH2}$ and such extended bandpass upper limit is designated as $B_{CHH}$.

The gain amplifier 31 is inserted after low pass filter 29 to present pre-emphasis to the limited bandwidth chrominance signal amplitude prior to frequency modulating a carrier, for the same reasons given in connection with the description of pre-emphasis block 11 for a corresponding function in the luminance channel. In order to maintain proper phase relationship with the color signal of the composite video input 3 from video source 1, a color subcarrier signal 39 is routed to chroma reference generator 28 to synchronize the frequency and the phase of the subcarrier reference frequency $f_{SCref}$.

Color subcarrier 39 from the video source 1 also serves to synchronize the voltage controlled oscillators 1 and 2 of audio signal blocks 33 and 35. The audio VCO 1 and audio VCO 2 blocks 33 and 35, respectively, output a frequency modulated signal modulated by, again respectively, the audio signals on audio channels 1 and 2, typically a stereo or dual channel audio program.

For an understanding of an appropriate optical modulator capable of encoding the frequency modulated signal from summing amplifier 21 onto a videodisc, reference is made to the aforementioned U.S. Pat. No. 4,225,873. Since the concepts underlying the present invention concern the generation of and detection of compressed bandwidth signal transmissions and/or recordings, detailed operation of the optical modulator and optical demodulator will not be treated here.

Figure 2:
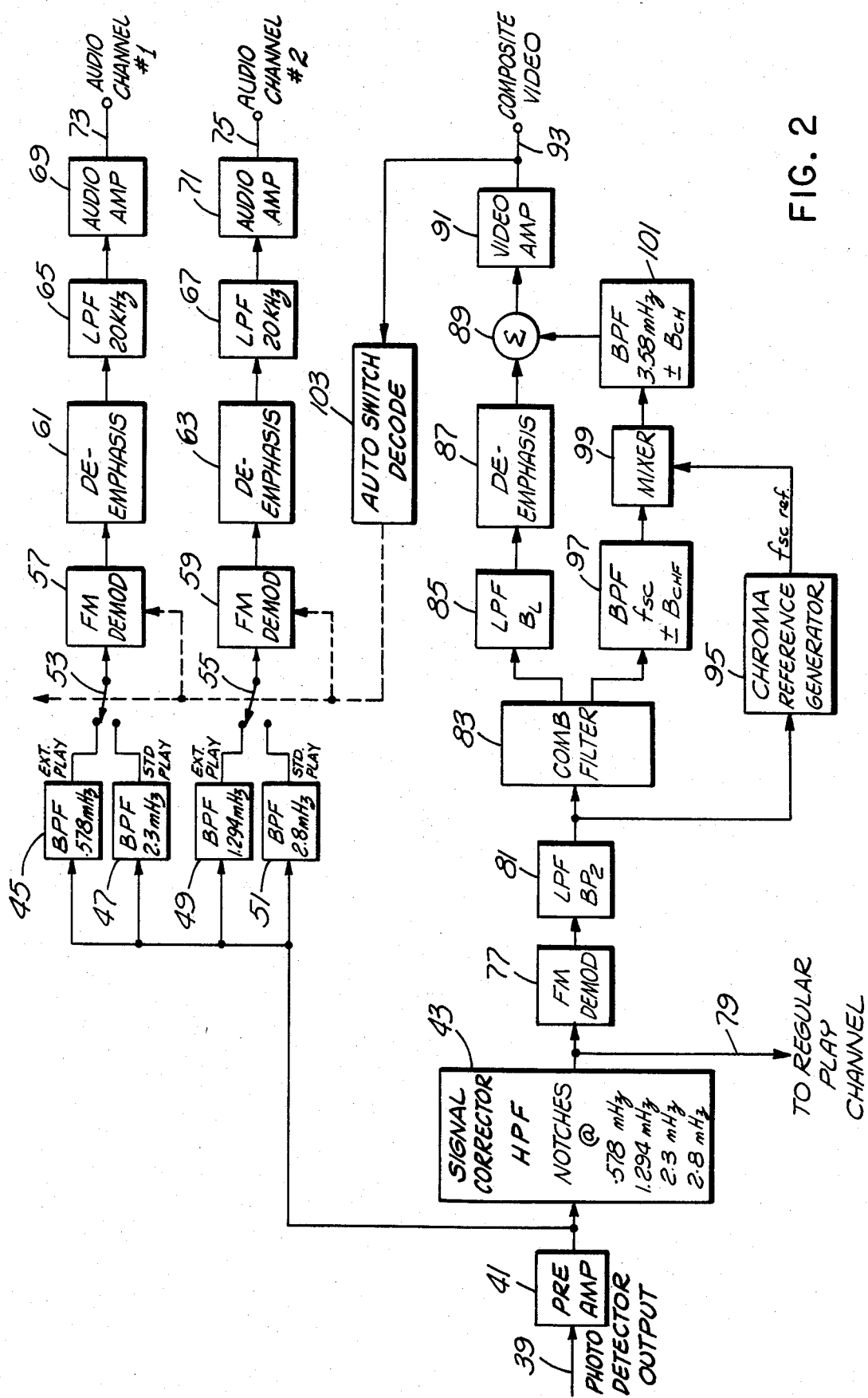
FIG. 2 is a block diagram of the playback electronics for reconstructing the picture and sound from a compressed bandwidth modulation format.

A compressed bandwidth signal decoding circuit is shown in FIG. 2 in block diagram form. In a preferred embodiment of the invention, FIG. 2 represents the playback electronics of a videodisc player. As such, a photodetector output on line 39 is amplified in standard fashion by pre-amplifier 41 and routed to the signal corrector 43. Signal corrector 43 has two basic functions. First, it includes a high pass filter for filtering out low frequency noise, and secondly provides frequency nulls, i.e. notches, at the audio subcarrier frequencies so as to minimize audio interference in the subsequently demodulated video signal. (See U.S. Pat. No. 4,223,349, by Dakin et al, and assigned to the assignee of the present application.)

The output of signal corrector 43 is routed two places, first to the regular play channel for the processing of full luminance/full color video, and to the lower signal path shown in FIG. 2 for the processing of compressed bandwidth video when appropriate. Since the processing of regular play video is not the subject of this specification, no further details for the standard mode of operation will be given or shown. Operation of the compressed bandwidth video recovery circuitry will now be analyzed.

The signal corrected FM video carrier is sent to a known type of FM demodulator 77 the output of which corresponds to the compressed bandwidth video from summing amplifier 17 in FIG. 1. At this point in the diagram, the signal is a composite video signal containing both luminance and chrominance information. This composite signal is sent to low pass filter 81 which, since it is passing the compressed bandwidth video information, has a lower passband (BP$_2$) than that associated with standard NTSC video.

From low pass filter 81, the video signal is sent to comb filter 83 which operates in a manner similar to that of comb filter 5, having reference to FIG. 1. The comb filter 83 thus separates the luminance from the chrominance information in the input composite video signal, sending the luminance baseband signal having a bandwidth $B_L$ to low pass filter 85 and the chrominance subcarrier with its sidebands $f_{SC2} \pm B_{CHF}$ to bandpass filter 97. The luminance signal from low pass filter 85 is de-emphasized in block 87 to compensate for the pre-emphasis given the luminance signal in block 11 of FIG. 1. A chroma reference generator 95 outputs a subcarrier reference frequency $f_{SCref}$ kept sync locked to the color information in the FM demodulated video from a line emanating from low pass filter 81. The subcarrier reference frequency, somewhat analogous to the local oscillator output of a standard FM radio set, is routed to mixer 99, a second input of which is obtained from bandpass filter 97, the combination of chroma reference generator 95 and mixer 99 performing a hetrodyning effect to produce a difference frequency product of modulation in the output of mixer 99 so as to re-establish the original color subcarrier frequency $f_{sc1}$ according to NTSC standards. The subcarrier corrected chrominance signal from mixer 99 then passes through bandpass filter 101 having a chrominance bandpass of $\pm B_{CH}$. The thus restored and de-emphasized (attenuated) chrominance subcarrier and sideband products are summed with the demodulated luminance signal from de-emphasis circuit 87 in summing amplifier 89, and the resultant composite video product is amplified in video amplifier 91 and routed over line 93 to the video output terminal of the player.

Returning to the output of pre-amp 41 in FIG. 2, a series of bandpass filters 45, 47, 49, and 51 receive the pre-amplified photodetector output which represents the FM spectrum of energy containing both audio and video spectral information. Assuming switches 53 and 55 are in the extended play position as shown in FIG. 2, bandpass filters 45 and 49 will pass the respective audio subcarriers and their sideband components onto the two audio channels 1 and 2 each of which contain the standard FM demodulator blocks 57, 59, de-emphasis blocks 61, 63, low pass filters 65, 67 and audio amplifiers

69, 71. The values shown in the blocks 45 and 49 will be developed later in this specification.

In similar fashion, when a standard play signal is received, bandpass filters 47 and 51 select the audio subcarriers and associated sideband products, and with switches 53 and 55 in their lower FIG. 2 position, audio channels 1 and 2 will output the audio information derived from a standard play videodisc. The values of 2.3 mHz and 2.8 mHz for bandpass filters 47 and 51 are taken from existing videodisc technology, the values consistent with those of the Bogels technical article discussed earlier in this description.

In a preferred embodiment of the invention, an auto switch decode circuit 103 is responsive to an instruction code during the vertical interval of one or more tracks at the beginning of disc play, and auto switch decode circuit 103 thus operates or does not operate switches 53 and 55 depending upon whether or not the information decoded signifies the information on the disc as standard play or extended play (compressed bandwidth data), respectively. In FIG. 2, auto switch decode circuit 103 gets its composite video signal from video amplifier 91. Alternatively, the decode circuit could get its composite video input from the regular play channel or could respond to a stimulus from a microprocessor typically incorporated into the electronics of modern videodisc playback machines. Of course, when switches 53 and 55 are switched from one position to the other, appropriate modifications of the FM demodulators 57 and 59 are made simultaneously to accommodate the appropriate audio subcarrier frequency. This is represented by the dotted line extending to these two demodulator circuits in FIG. 2.

Figure 3:
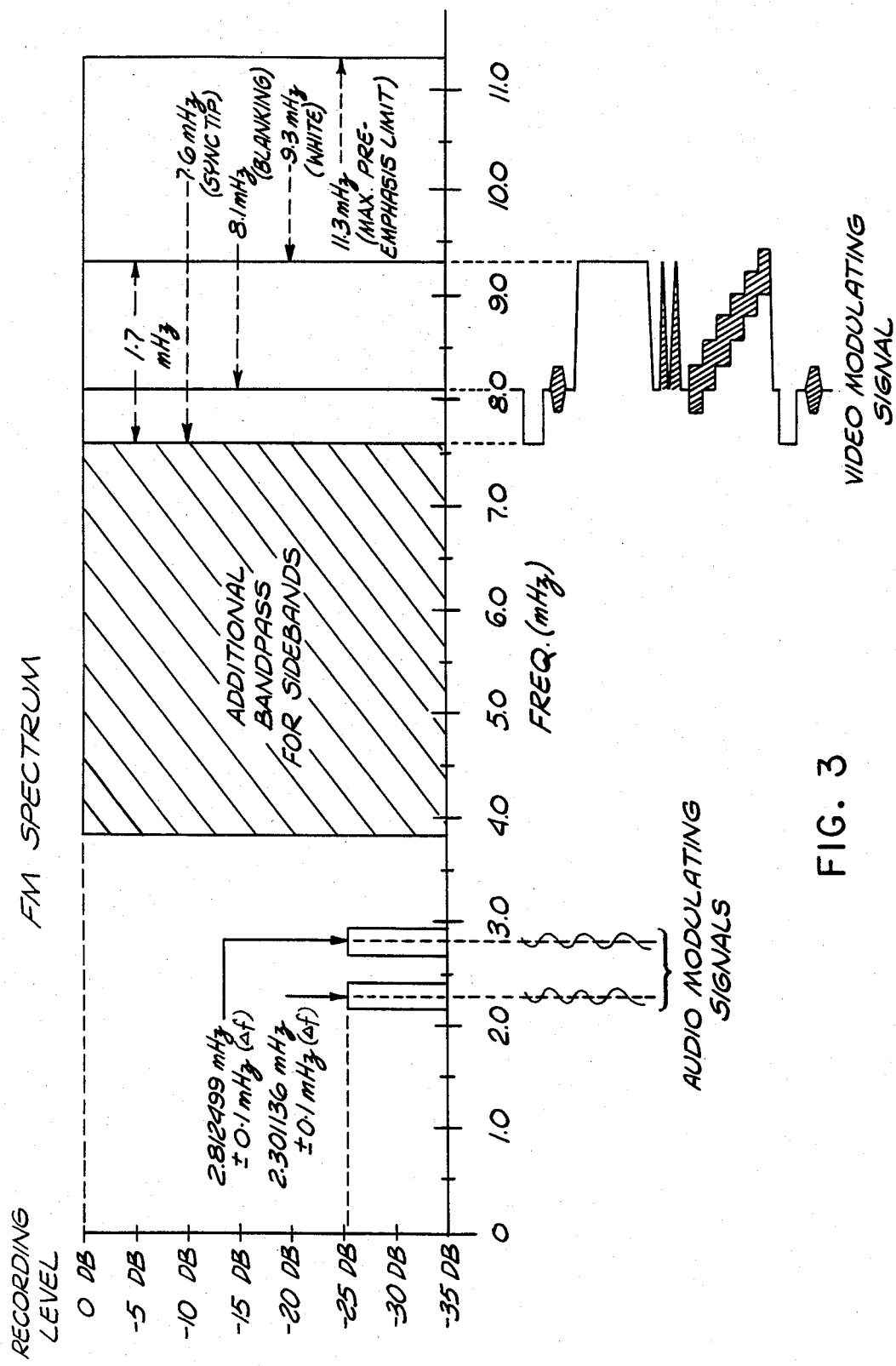
FIG. 3 is a spectral distribution diagram showing the FM spectrum points for a full luminance/full color modulation format.

FIG. 3 shows the FM spectral distribution for the various intelligence information signals modulating the FM carrier for the standard play mode, and the values given on FIG. 3 are consistent with those discussed earlier in connection with the modulation technique according to the Bogels article. Since the example for purposes of illustrating the concepts of this invention concern the recording and playback of audio and video information on to and from a videodisc, FIG. 3 shows the recording level along a Y axis in decibels and a frequency scale along the X axis. As shown, the video modulating signal modulates the carrier from a reference (blanking) frequency at 8.1 mHz. The spectral frequency for the sync tip is shown at 7.6 mHz, and on the opposite extreme of the modulating signal, white level, is shown at 9.3 mHz. Recalling that a preemphasis circuit 11 (FIG. 1) advantageously operates on the high frequency components of the video signal, FIG. 3 shows that the maximum pre-emphasized limit frequency is 11.3 mHz. As a result, the frequency deviation for the peak-to-peak video modulating signal, excluding pre-emphasis, is 1.7 mHz.

In order to accommodate the first order sidebands representing the detail of the luminance and chrominance portion of the picture, sidebands span a distance of 4.2 mHz from the blanking level of 8.1 mHz, and is shown in FIG. 3 to extend to the low frequency value of 3.9 mHz.

A pair of audio subcarriers are shown positioned at 2.3 mHz and 2.8 mHz (approximately) each having a frequency deviation of ±100 kHz at 100% modulation.

As can be observed by reference to FIG. 3, 11.3 mHz, is required to record and reproduce the full luminance/full color/stereo sound program.

The standard optical videodisc rotating at 1800 RPM and carrying its information in the form of FM modulated signals extending up to as high as 11.3 mHz can accommodate a one half hour program in the CAV mode or a one hour program in the CLV mode as discussed earlier. The object of the present invention is to compress the recorded signal into a smaller bandwidth while retaining reasonable performance and thus extend the playing time in both CAV and CLV modes. The analysis to follow has the goal of calculating an appropriate coding format for the FM carrier and subcarriers to result in the doubling of the playing time of the disc. An exact doubling of the playing times is a logical choice, especially in the CAV mode where a doubling of the playing time and halving of the rotational speed of the disc will permit alignment of the vertical intervals along a radius of the disc and therefore maintain many of the interesting functions of the players such as still framing, slow motion, step framing, and the like while maintaining a disc rotational speed of one half that of standard play. Thus, by selecting the rotational speed between standard play and extended play to have an exact multiple relationship, a machine can be designed to play both modes of signal formatting without extensive modification or control circuitry. The analysis will therefore proceed on the basis that the rotational speed will be reduced by one-half and doubling the playing time for the disc will be attained. A calculation of the color subcarrier frequency and audio subcarrier frequencies will then be made to ensure that adequate spectral territory can be utilized without causing interference of one signal with another in the ultimate playback device. Similarly, in verifying that the applied factor of two is an appropriate choice, a check on the resulting signal to noise ratio figures will be made.

In view of the compactness of the expected FM spectrum of the compressed bandwidth system, the composite video signal must have interleaved luminance and chrominance spectra, and new chrominance subcarrier ($f_{SC2}$) and reference frequency ($f_{SCref}$) for creating the new chrominance subcarrier must be determined.

Finally, the audio carrier frequencies ($f_{a1}$ and $f_{a2}$) must be determined to minimize the intermodulation products on the visual television display.

Recognizing the need in a limited bandwidth system for separating the chrominance and luminance signals, and further recognizing the beneficial effects of a comb filter which allows a chrominance signal, placed in the luminance band, to be recovered in the player electronics, this option was chosen to be used with the new compressed bandwidth format. The chrominance information could be recorded in a different type of information channel such as by duty cycle modulation, but the separation of luminance and chrominance into separate channels is known to cause difficulties. Since the two signals must ultimately be matrixed together, and the amplitudes, frequency responses, and even phase characteristics of the two channels matched, separating the chrominance and luminance in the recording/playback process was avoided in the new system.

In order to obtain extended play characteristics, the video signal frequency bandwidth must be decreased, and likewise the color subcarrier frequency must also be reduced. Additionally, lowering the subcarrier frequency improves the signal-to-noise ratio for a given chrominance subcarrier level, since the noise power density in an FM system is proportional to the square of the difference in frequency from the FM carrier. On the other hand, when the chrominance subcarrier is too low, the luminance components representing the higher sideband frequencies are large enough to cause interference with the chrominance information. Since the FM spectral frequencies of the luminance signal are to be one half those of the corresponding full luminance/full color spectrum, it can be readily concluded that color subcarrier frequencies below 1 mHz are subject to the luminance component interference just described, and therefore the new subcarrier frequency should lie above 1 mHz in order to prevent such interference. The NTSC subcarrier $f_{SC1}$ is placed at:

$$f_{SC1} = 455 f_H/2 \qquad (1)$$

where $f_H$ is the line frequency (15734.264 Hz).

One way to generate a new subcarrier is to mix a reference frequency $f_{SCref}$ with $f_{SC1}$ (NTSC) It is convenient to have a multiple of $f_{SC1}$ as the clock frequency of the system; thus $f_{SCref}$ should be synchronous with $f_{SC1}$ or:

$$f_{SCref} = N1/N2 f_{SC1} \qquad (2)$$

when $N_1$ and $N_2$ are integers.

The new subcarrier frequency $f_{SC2}$ should be offset ½ line like the NTSC chroma subcarrier or:

$$f_{SC2} = n f_H + \tfrac{1}{2} f_H = (2n+1) f_h/2, \qquad (3)$$

where n is an integer. Because of the relationship:

$$f_{fSC2} = f_{SCref} - f_{SC1}, \qquad (4)$$

it follows that:

$$n = 455 \frac{P_1}{N_2} - 228, \text{ where } N_1 = 2P_1, \qquad (5)$$

Figure 4:
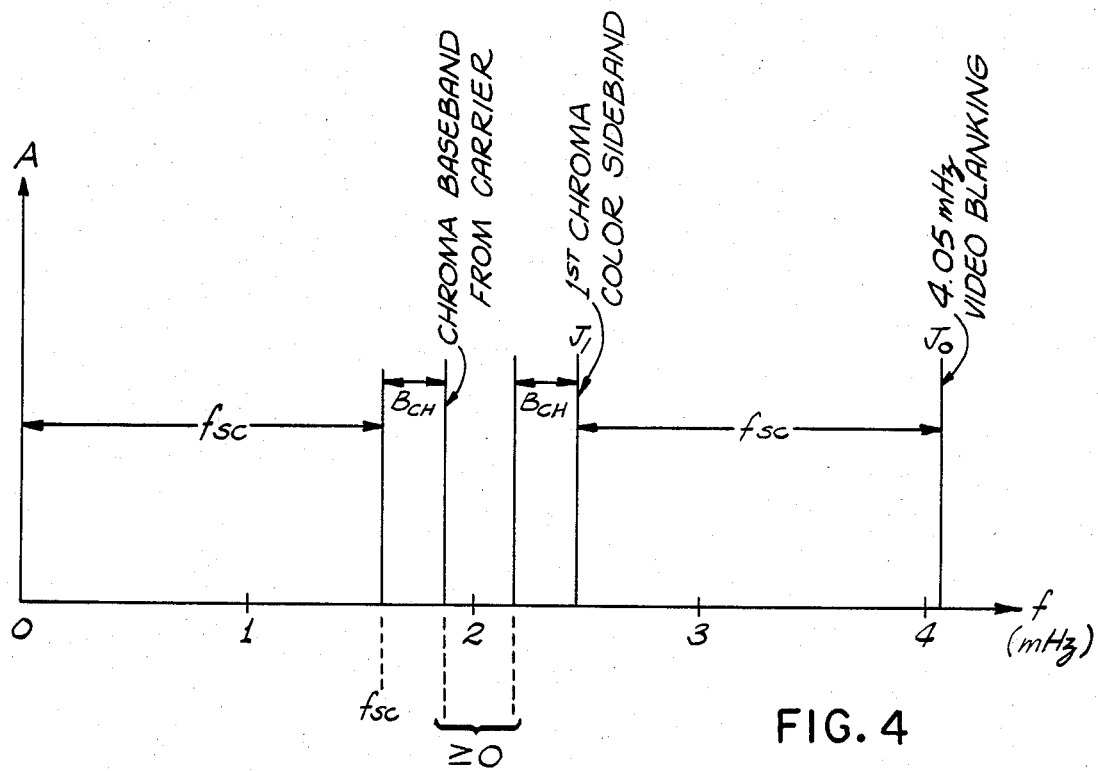
FIGS. 4 and 5 are frequency plots indicating chrominance bandwidth limits and color subcarrier frequency points for derivation of the frequency of a compressed bandwidth color subcarrier.

Having this basic required relationship in mind, in order to minimize cross-interference between chrominance baseband and chrominance sidebands, the following two criteria for the choice of a subcarrier frequency and a chrominance bandwidth for a compressed bandwidth signal format must be observed:

First, to allow no overlap of the chrominance baseband signal (from fixed length asymmetry) and the first order chrominance sideband $J_1$, from blanking carrier frequency reference (see FIG. 4);

$$f_{SC2} + B_{CH2} \leq \tfrac{1}{2} f_{b1} - f_{SC2} - B_{CH2} \qquad (6)$$

or $$f_{sc2} + B_{CH2} \leq \tfrac{1}{2} f_{b1}$$
or $f_{sc2} + B_{CH2} \leq \tfrac{1}{4} f_{bl}$
and substituting $f_{b1} = 8.1$ mHz, $$f_{SC2} + B_{CH2} \leq 2.025 \text{ mHz}. \qquad (7)$$

Figure 5:
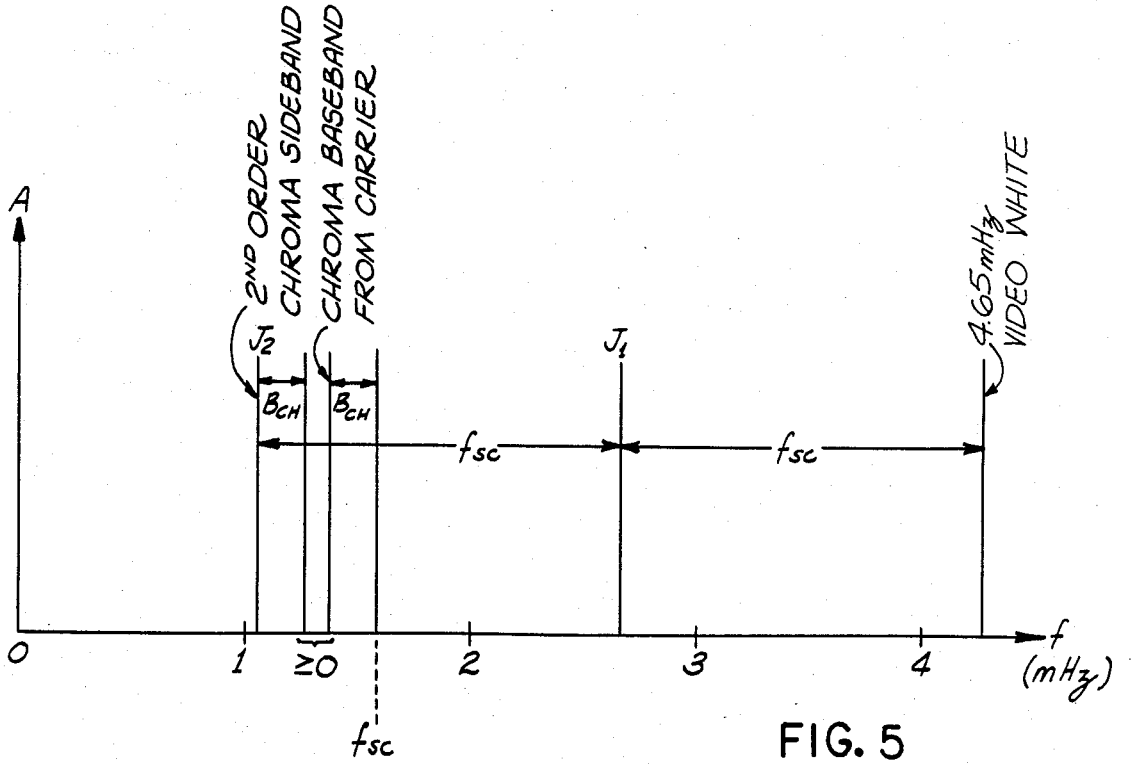

Second, to allow no overlap of the chrominance baseband signal and the second order chrominance sideband, $J_2$, from white carrier frequency reference (see FIG. 5);

$$f_{SC2} - B_{CH2} \geq \tfrac{1}{2} f_{w1} - 2 f_{SC2} + B_{CH2} \qquad (8)$$

or

-continued
$$3 f_{sc2} - 2 B_{CH2} \geq \tfrac{1}{2} F_{w1}$$
or $3 f_{sc2} - 2 B_{CH2} \leq \tfrac{1}{2} f_{w1}$
and substituting $\tfrac{1}{2} f_{w1} = \tfrac{1}{2} 9.3$ mHz, $$3 f_{SC2} - 2 B_{CH2} \geq 4.65 \text{ mHz}. \qquad (9)$$

Figure 6:
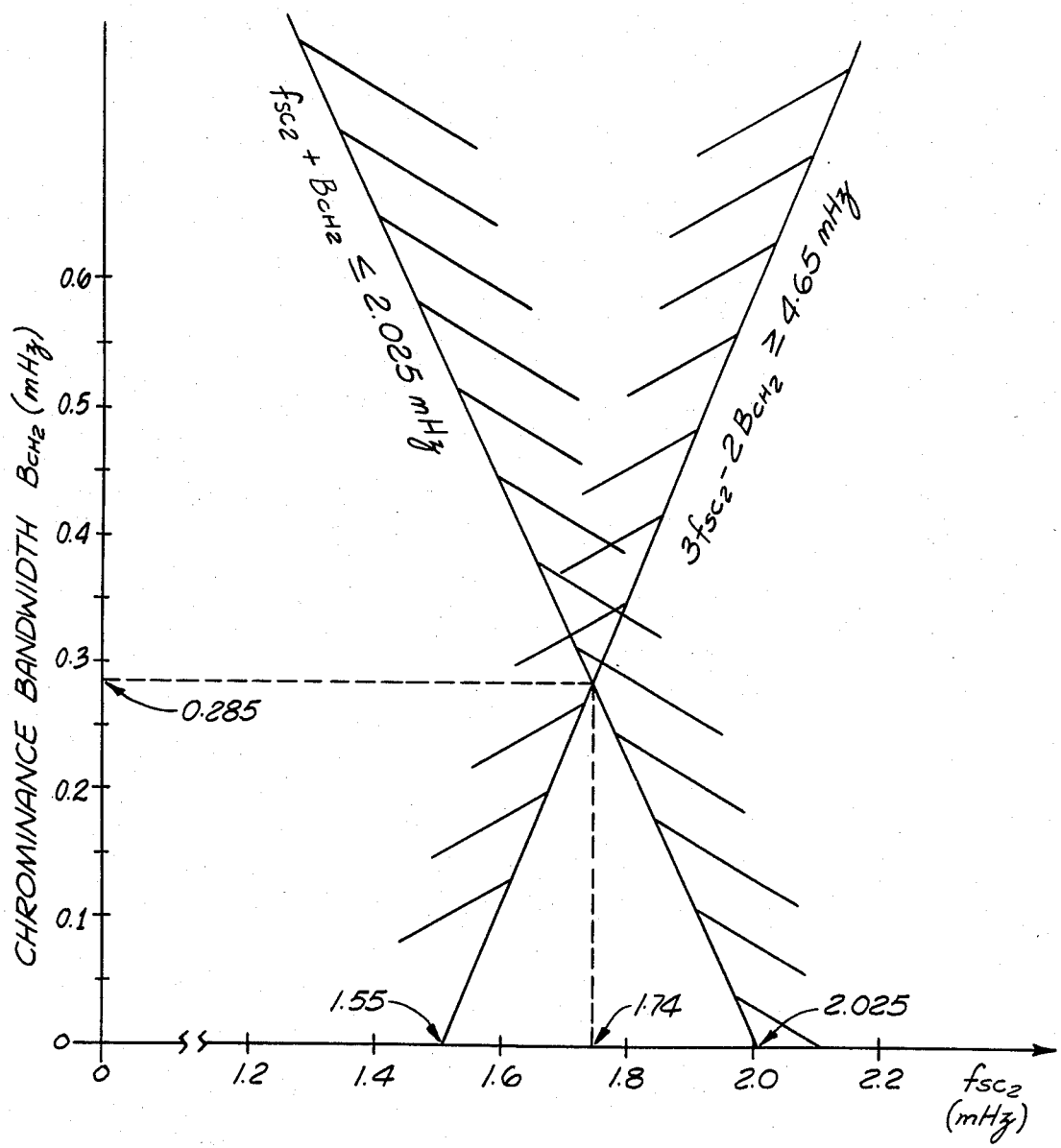
FIG. 6 shows a color subcarrier frequency versus chroma bandwidth plot for the derivation of an optimum compressed bandwidth color subcarrier frequency.

To find an optimum value for $f_{SC2}$, a plot of formulas (7) and (9) is shown in FIG. 6. The triangular area above the horizontal coordinate and enclosed by the two lines representing equations (7) and (9) contain all acceptable values for $f_{SC2}$ and $B_{CH2}$ which meet both equations. Since the maximum value for $B_{CH2}$ would be desirable, the logical choice for $B_{CH2}$ would occur at the peak of the aforementioned triangle; i.e., maximizing $B_{CH2}$ in equations (7) and (9) yields the optimum values for the two parameters where $f_{SC2}$ is approximately 1.7 mHz. Now applying formula (5) while keeping $N_1$ and $N_2$ at minimum values to simplify the hardware required to generate $f_{SCref}$, calculation results for the variable n, $P_1$, $N_1$, $N_2$, $f_{SCref}$, and $f_{SC2}$ for values of $f_{SC2}$ around 1.7 mHz are shown below:

| n | $P_1$ | $N_1$ | $N_2$ | $f_{SCref}$(mHz) | $f_{SC2}$(mHz) |
|---|---|---|---|---|---|
| 101 | 47 | 94 | 65 | 5,176573 | 1,597028 |
| 102 | 66 | 132 | 91 | 5,192307 | 1,612762 |
| 103 | 331 | 662 | 455 | 5,208041 | 1,628496 |
| 104 | 332 | 664 | 455 | 5,223776 | 1,644231 |
| 105 | 333 | 666 | 455 | 5,239510 | 1,659965 |
| 106 | 334 | 668 | 455 | 5,255244 | 1,675699 |
| 107 | 67 | 134 | 91 | 5,270978 | 1,691433 |
| 108 | 48 | 96 | 65 | 5,286713 | 1,707168 |
| 109 | 337 | 674 | 455 | 5,302447 | 1,722902 |
| 110 | 26 | 52 | 35 | 5,318181 | 1,738636* |
| 111 | 339 | 678 | 455 | 5,333915 | 1,754370 |
| 112 | 68 | 136 | 91 | 5,349650 | 1,770105 |
| 113 | 341 | 682 | 455 | 5,365384 | 1,785839 |
| 114 | 342 | 684 | 455 | 5,381118 | 1,801573 |
| 115 | 49 | 98 | 65 | 5,396852 | 1,817307 |
| 116 | 344 | 688 | 455 | 5,412.87 | 1,833042 |
| 117 | 69 | 138 | 91 | 5,428.21 | 1,848776 |
| 118 | 346 | 692 | 455 | 5,444.55 | 1,864510 |
| 119 | 347 | 694 | 455 | 5,459790 | 1,880245 |
| 120 | 348 | 696 | 455 | 5,475.24 | 1,895979 |

As can be seen, the set of values which best meet the above requirements to keep $N_1$ and $N_2$ at minimum values produces a value for $f_{SC2}$ of 1.738636 mHz, herinafter rounded up to the value 1.739 mHz.

At this value for $f_{SC2}$, $B_{CH2}$ calculates to the value 0.286 mHz from formula (7).

An acceptable practical lower limit for the chrominance bandwidth, as subjectively determined by extensive observer evaluation and experimentation, is 0.25 mHz, and therefore the initial hypothesis to halve the full luminance/full chrominance values for luminance bandwidth (i.e., $\tfrac{1}{2} B_{L1} = B_{L2} = \tfrac{1}{2}$ 4.2 mHz = 2.1 mHz) is a satisfactory choice insofar as the resulting chrominance bandwidth is concerned (i.e., $B_{CH2} = 0.286$ mHz > 0.25 mHz).

From the above table of figures, it can be seen that for the chosen set of values, $f_{SCref}$ is 5.318181 mHz, and this is the frequency of oscillation for the chroma reference generator 28 in FIG. 1 and chroma reference generator 95 in FIG. 2. It will be recalled that the new subcarrier $f_{SC2}$ was derived by hetrodyning and using the difference frequency so obtained, i.e., 5.318181 mHz − 3.579545 mHz must equal the new subcarrier frequency 1.738636 mHz, which it does.

After selection of the chrominance subcarrier frequency, the placement of the audio subcarrier frequencies may be selected.

First, it is necessary to determine the available frequency bands within which the audio subcarriers can be placed and which will permit minimum audio interference in the picture.

The placement of the audio carriers requires careful consideration. If the audio carriers are placed in the FM spectrum corresponding to the video baseband they will not directly interfere with the video. However, baseband video may cause interference in the audio channel. It is, therefore, desirable to keep the audio carriers below $f_{SC2}-B_{CH2}$ such that the relatively high level chroma carrier at $f_{SC2}$ in the baseband signal can be avoided. Very low audio carrier frequencies i.e., below about 0.3 mHz, are also undesirable because of conflicting large luminance baseband components. The two audio-carrier frequencies can be chosen to be, like $f_{SC2}$, offset a sub-multiple of the horizontal line frequency. For stereo or 2 channel audio, it is desirable to offset carrier $f_{a1}$ by $f_H/4$, and $f_{a2}$ by $3f_H/4$ or:

$$f_{a1} = n_1 f_H + \tfrac{1}{4} f_H = (4n_1 + 1) f_H/4 \qquad (10)$$

$$f_{a2} = n_2 f_H + \tfrac{3}{4} f_H = (4n_2 + 3) f_H/4 \qquad (11)$$

Obviously, $n_1$ must be far enough away from $n_2$ to allow adequate deviation. If the audio frequency, $f_a$, is:

$$f_a = Q/P \, f_{SC1} \qquad (12)$$

where Q and P must be integers, then the following conditions exist: From formula (1), $f_{SC1}=455\,(f_H/2)$, where $f_H$ is 15,734,264 Hz.

$$f_H/2 = f_{SC1}/455, \text{ or } f_H/4 = f_{SC1}/910 \qquad (13)$$

Then from formulas (10), (12), and (13), it follows that for $f_{a1}$ $$\frac{Q_1}{P_1} = (4n_1 + 1)/910. \qquad (14)$$

Similarly, from formulas (11), (12), and (13), it follows that for $f_{a2}$ $$\frac{Q_2}{P_2} = (4n_2 + 3)/910. \qquad (15)$$

Having the above basic requirements in mind for the selection of $f_{a1}$ and $f_{a2}$, in order to minimize the interaction between audio and chrominance baseband and sideband components which would cause audio interference in the picture, there are three bands of frequencies available for the spectral location of the two audio subcarriers.

Figure 7:
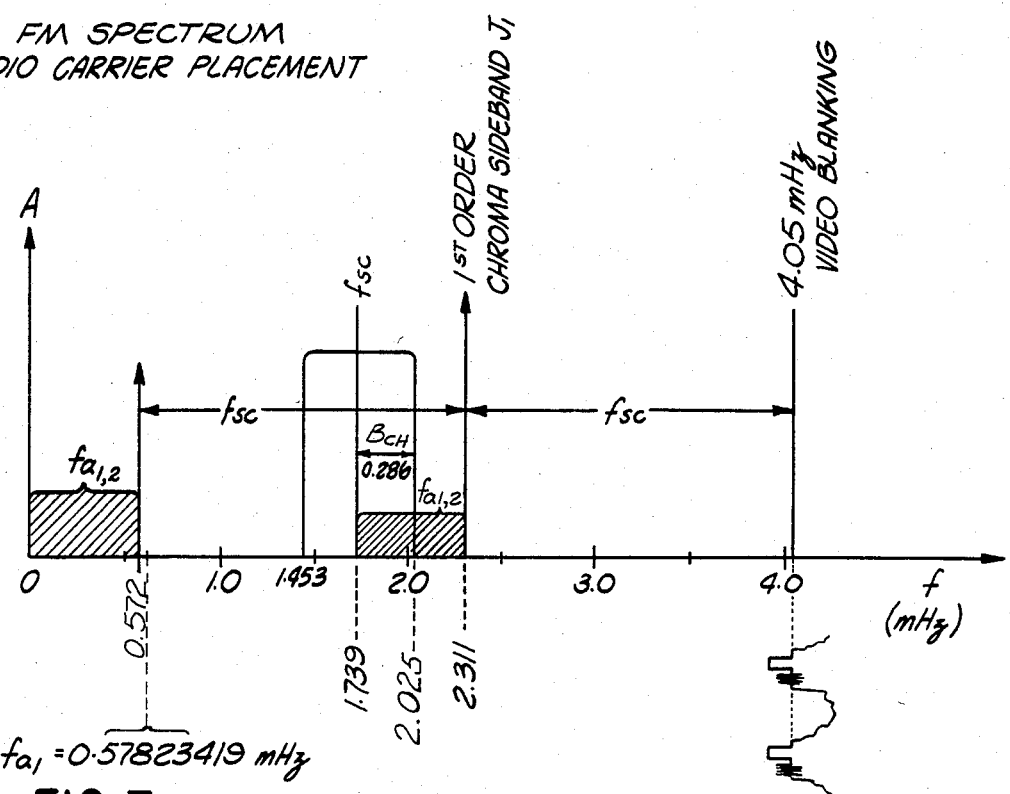
FIGS. 7 and 8 show frequency plots illustrative of the parameters to be considered in the derivation of audio subcarrier frequency choices.

First, a frequency band is considered between the first order chrominance sideband $J_1$ and the chrominance baseband signal, and considering chrominance bandwidth, (see FIG. 7):

$$f_{SC2} + B_{CH2} \leq f_{a1,2} \leq f_{b2} - f_{SC2} - B_{CH2} \qquad (16)$$

Substituting from the color subcarrier analysis, $$1.739 + 0.286 \leq f_{a1,2} \leq 4.05 - 1.739 - 0.286 \text{ (mHz)}$$

$$2.025 \leq f_{a1,2} \leq 2.025 \text{ (mHz)} \qquad (7a)$$

If chrominance bandwidth contributions are ignored, the factor $B_{CH2}$ is removed from both sides of equation (16), and substituting values then reveals the frequency band $$1.739 \leq f_{a1,2} \leq 2.311 \text{ (mHz)}. \qquad (7b)$$

Figure 8:
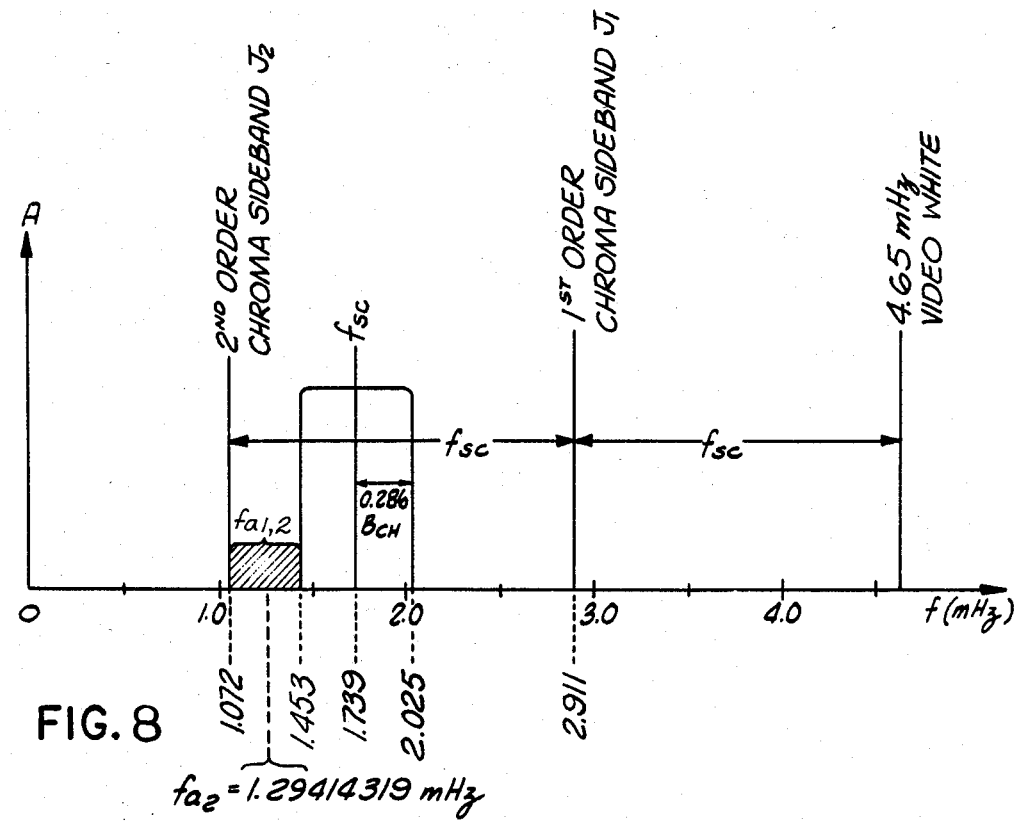

A second frequency band exists between the chrominance baseband signal and the second order chrominance sideband, and considering 1st order but ignoring 2nd order chrominance bandwidth components (see FIG. 8):

$$f_{w2} - 2f_{SC2} \leq f_{a1,2} \leq f_{SC2} - B_{CH2} \qquad (18)$$

Substituting from the color subcarrier analysis, $$.65 - 2(1.739) \leq f_{a1,2} \leq 1.739 - 0.286 \text{ (mHz)}$$

$$1.072 \leq f_{a1,2} \leq 1.453 \text{ (mHz)} \qquad (9)$$

A third frequency band exists between D.C. and the second order chrominance sidebands ignoring 2nd order chrominance bandwidth components (see FIG. 7):

$$0 \leq f_{a1,2} \leq f_{b2} - 2f_{SC2} \qquad (20)$$

Substituting from the color subcarrier analysis, $$0 \leq f_{a1,2} \leq 4.05 - 2(1.739) \text{ (mHz)}$$

$$0 \leq f_{a1,2} \leq 0.572 \text{ (mHz)} \qquad (21)$$

A signal in the first band, formula (17a) or (17b), would demodulate to produce a high frequency pattern in the TV display. That would make this band the least desirable choice of bands.

The second band, formula (19), has no serious drawbacks; however the band is only wide enough to allow one carrier.

The third band, formula (21), has several interfering signals; however, their effect is small. They are: the noise spectrum of the recording laser which typically falls linearly from −40 dB (referred to the unmodulated carrier) at DC to −70 dB at 1.5 mHz, the luminance baseband signal, and a demodulated video signal at $2f_{a1,2}$ caused by the unsymmetrical amplitude modulation of the FM signal due to $f_{a1,2}$. This component which is generated from the limiting process, is independent of asymmetry and equivalent to $J_2$. The worst case amplitude (the other sideband either removed by the modulation transfer function or phase altered to make it FM) would be −42 dB with respect to 100 IRE at 1 mHz for a $f_a$ at 0.5 mHz.

As discussed earlier the carriers will have a $\tfrac{1}{2}$ line offset to one another and a $\pm\tfrac{1}{4}$ line offset to the chroma sideband signal. Having reference to the variable P in formula (12), it should be noted that a component of the reference frequency ($f_{SC1}/P$) will appear in the demodulated audio spectrum, and therefore this frequency should be above the audio bandwidth to extend beyond the hearing range, or:

$f_{SC1,2}/P_{1,2} \geq 20 \text{ kHz} \rightarrow P_{1,2} \leq 178$ (22)

To keep the range of the phase detector large, the divider $Q_{1,2}$ should be as large as possible and still maintain the above restriction.

Taking into consideration all of the conditions on the choice of audio subcarrier frequencies, by elimination of the first of the three available bands for the reason given above, and allowing for full deviation of each of two audio carriers without interference one with the other, it is readily apparent that one audio carrier should be placed in the second of the above-mentioned bands at $f_{a2}$ according to formula 19, and the other audio carrier should be placed in the third-mentioned band at $f_{a1}$ according to formula 21.

Returning to formula (14) for $f_{a1}$, a printout of all possible combinations of n, $Q_1$, $P_1$, $f_{a1}$, and $f_{SC1}/P_1$ which fall within the constraints set forth above is shown below:

| n | $Q_1$ | $P_1$ | $f_{a1}$(mHz) | $f_{SC1}/P_1$(kHz) |
|---|---|---|---|---|
| 19 | 79 | 910 | .31075171 | 3.9336 |
| 20 | 83 | 910 | .32648597 | 3.9336 |
| 21 | 87 | 910 | .34222024 | 3.9336 |
| 22 | 1 | 10 | .35795450 | 357.9545* |
| 23 | 19 | 182 | .37368876 | 19.6678 |
| 24 | 99 | 910 | .38942303 | 3.9336 |
| 25 | 103 | 910 | .40515729 | 3.9336 |
| 26 | 107 | 910 | .42089155 | 3.9336 |
| 27 | 111 | 910 | .43662582 | 3.9336 |
| 28 | 23 | 182 | .45236008 | 19.6678 |
| 29 | 17 | 130 | .46809435 | 27.5350* |
| 30 | 123 | 910 | .48382861 | 3.9336 |
| 31 | 127 | 910 | .49956287 | 3.9336 |
| 32 | 131 | 910 | .51529714 | 3.9336 |
| 33 | 27 | 182 | .53103140 | 19.6678 |
| 34 | 139 | 910 | .54676566 | 3.9336 |
| 35 | 11 | 70 | .56249993 | 51.1364* |
| 36 | 21 | 130 | .57823419 | 27.5350* |
| 37 | 151 | 910 | .59396046 | 3.9336 |

To satisfy the constraint that $f_{a1} \geq 0.3$ mHz, n must be greater than 18.

To satisfy the constraint that $f_{a1} \lesssim 0.572$ mHz (formula 21), $n \leq 36$ must be satisfied.

To satisfy the constraint that $P_1 \leq 178$ (formula 20) $f_{SC1}/P_1 \geq 20$ kHz. This leaves the four choices indicated with astrisks in the table.

Finally, to satisfy the constraint that $Q_1$ be as large as possible, from the four choices n=36 is the most optimum choice.

It should be noted that for the choice of n=36, $f_{a1}=0.57823419$ mHz slightly exceeds the theoretical limit of 0.572 mHz, but the trade-off for a proportionally greater value for $Q_1$ made the choice reasonable from a practical viewpoint. As a result, for the compressed bandwidth format of the present invention the lower audio subcarrier $f_{a1}=0.57823419$ mHz.

Returning to formula (15) for $f_{a2}$, a printout of all possible combinations of n, $Q_2$, $P_2$, $f_{a2}$, and $f_{SC1}/P_2$ which fall within the constraints set forth above is shown below:

| n | $Q_2$ | $P_2$ | $f_{a2}$(mHz) | $f_{SC1}/P_2$(kHz) |
|---|---|---|---|---|
| 68 | 3 | 10 | 1.07386350 | 357.9545* |
| 69 | 277 | 910 | 1.08959776 | 3.9336 |
| 70 | 281 | 910 | 1.10533203 | 3.9336 |
| 71 | 57 | 182 | 1.12106629 | 19.6678 |
| 72 | 289 | 910 | 1.13680055 | 3.9336 |
| 73 | 293 | 910 | 1.15253482 | 3.9336 |
| 74 | 297 | 910 | 1.16826908 | 3.9336 |
| 75 | 43 | 130 | 1.18400335 | 27.5350* |
| 76 | 61 | 182 | 1.19973761 | 19.6678 |
| 77 | 309 | 910 | 1.21547187 | 3.9336 |
| 78 | 313 | 910 | 1.23120614 | 3.9336 |
| 79 | 317 | 910 | 1.24694040 | 3.9336 |
| 80 | 321 | 910 | 1.26267466 | 3.9336 |
| 81 | 5 | 14 | 1.27840893 | 255.6818* |
| 82 | 47 | 130 | 1.29414319 | 27.5350* |
| 83 | 333 | 910 | 1.30987746 | 3.9336 |
| 84 | 337 | 910 | 1.32561172* | 3.9336 |
| 85 | 341 | 910 | 1.34134590 | 3.9336 |
| 86 | 69 | 182 | 1.35708025 | 19.6678 |
| 87 | 349 | 910 | 1.37281451 | 3.9336 |
| 88 | 353 | 910 | 1.30854877 | 3.9336 |
| 89 | 51 | 130 | 1.40428304 | 27.5350* |
| 90 | 361 | 910 | 1.42001730 | 3.9336 |
| 91 | 73 | 182 | 1.43575157 | 19.6678 |
| 92 | 369 | 910 | 1.45148583 | 3.9336 |

To satisfy the constraint that 1.072 mHz $\leq f_{a2} \leq$ 1.453 mHz (formula 19), $68 \leq n \leq 92$.

To satisfy the constraint that $P_2 \leq 178$ (formula 20), $f_{SC1}/P_2 \geq 20$ kHz. This leaves the five choices indicated with an asterisk in the table.

To satisfy the constraint that $Q_2$ be as large as possible, the theoretically best combination of variables results in n=89 so that $Q_2=51$. However, it is observed that this theoretically best choice produces an audio subcarrier $f_{a2}=1.40428304$ mHz, and this value is dangerously close to the limit set by the aforementioned constraint that either audio subcarrier must be below $F_{SC2}-B_{CH2}=1.739-0.286=1.453$ mHz. Since the latter figure was derived ignoring secondary contributions of audio interference to the luminance baseband signal, and since the second best choice for $f_{a2}$ places the carrier substantially further away from the 1.453 mHz (approximate) limit, and since the value of $Q_2$ for the second best choice is 47 as compared with 51 for the best choice, it is considered a reasonable trade-off to gain an additional noise margin, and the second audio subcarrier frequency is thus chosen as $f_{a2}=1.29414319$ Hz.

Figure 9:
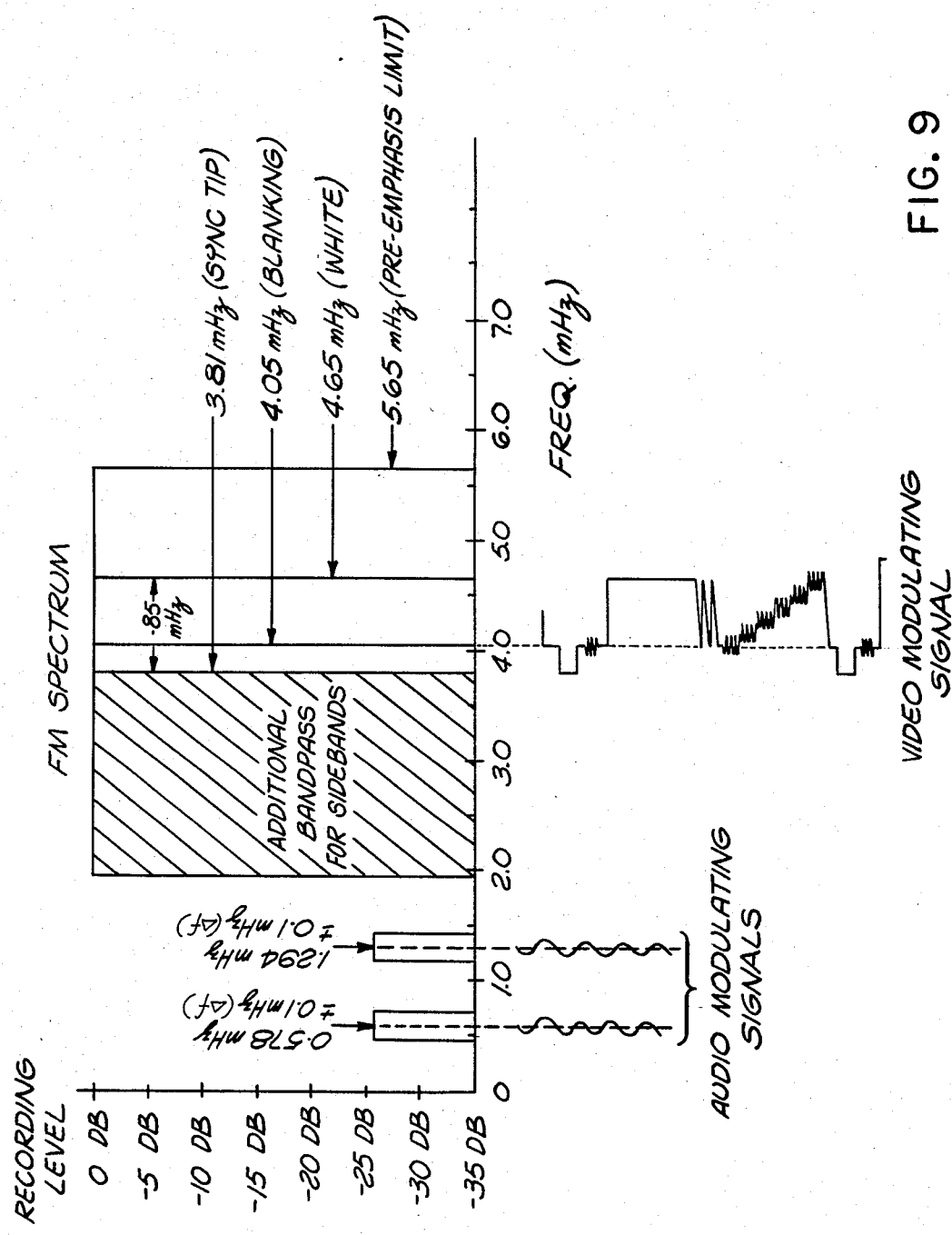
FIG. 9 is a spectral distribution diagram showing the FM spectrum points for a compressed bandwidth signal format according to the present invention.

FIG. 9 shows the FM spectrum frequency distribution for the new values for the audio and video carriers and sidebands of the compressed bandwidth format. The values for frequency have been rounded off for ease of presentation. This figure can be compared with the full luminance/full chrominance format shown in FIG. 3.

Figure 10:
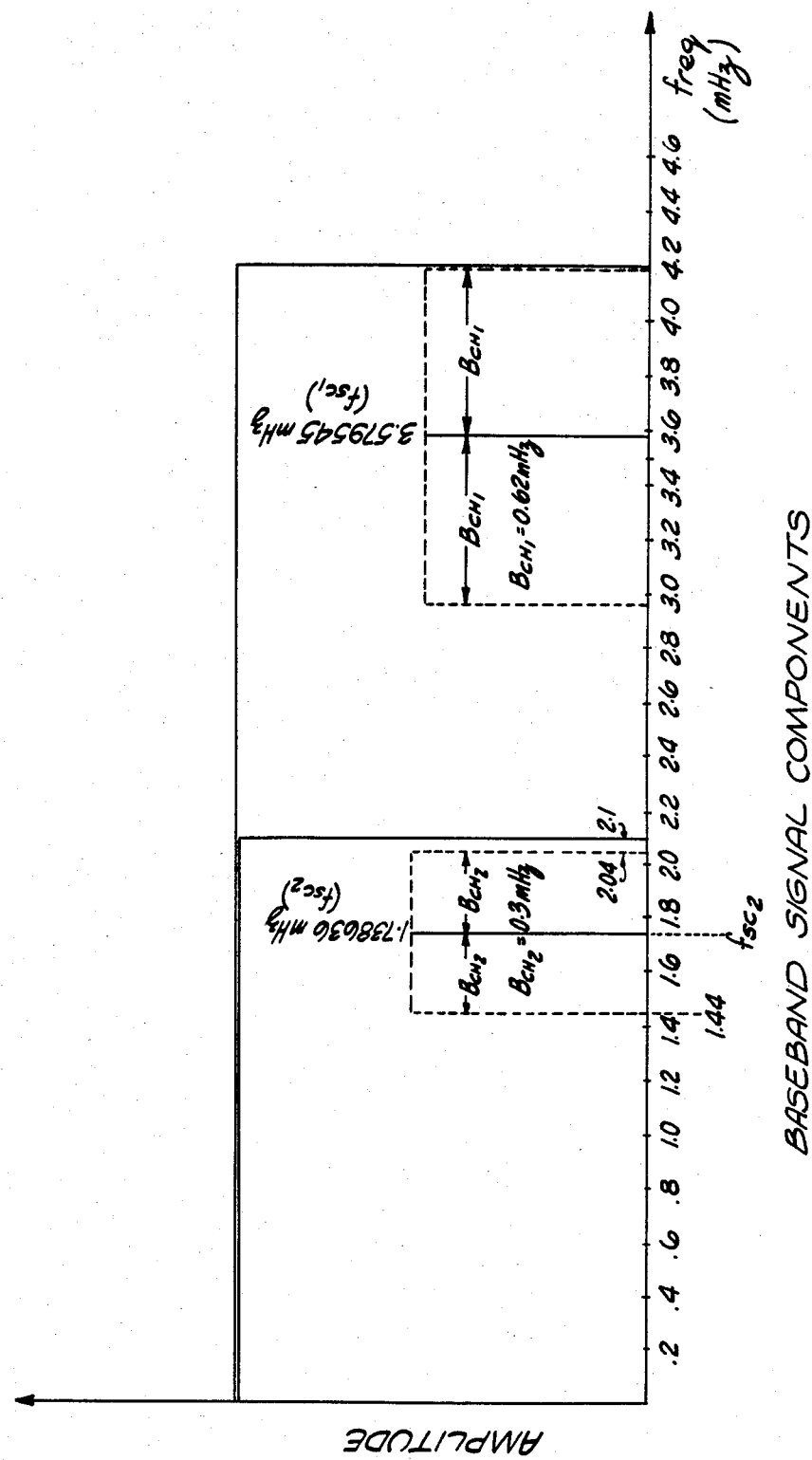
FIG. 10 is a frequency plot of the baseband signal components of the luminance, chrominance, and sound channels for both full luminance/full color and compressed bandwidth formats.

For comparison between the full luminance/full chrominance and compressed bandwidth formats, reference is made to FIG. 10 showing baseband video signal components for the two systems.

As a check on signal-to-noise ratio (SNR) figure using the newly established values derived for the compressed bandwidth format, using established formulas, it can be shown that the new format produces acceptable noise figures. For example, with pre-emphasis providing a $\Delta f$ of 0.6 mHz (i.e., $f_{max2}-f_{w2}=4.65$ mHz$-4.05$ mHz), it can be shown that the final luminance SNR (excluding IM products) will be 41.68 dB, a very respectable figure. This means that a high frequency full scale (100 IRE) signal would just touch the $f_{max2}=5.65$ mHz where a clipper is used to limit the high frequency excursion to $\leq 5.65$ mHz.

Similarly, using known derivation methods, the chrominance SNR, with pre-emphasis, calculates to 33 dB, again a figure well within acceptable limits.

For the audio channels, using an audio bandwidth $B_a$ of 20 kHz and a frequency deviation $\Delta f = \pm 100$ kHz, the amplitude of $f_{a1}$ relative to unmodulated carrier after limiting is 23 dB, while that of $f_{a2}$ is 28.5 dB, and the final audio SNR for both channels is 60 dB. These figures do not include the second order chrominance sideband contributions.

Having chosen the values of luminance bandwidth, chroma bandwidth and color subcarrier frequency, and audio subcarrier frequencies, the values of frequency in the various blocks of FIGS. 1 and 2 are determined. In this connection, in FIG. 1, low pass filter 7 has a bandwidth of 0 to 2.1 mHz, bandpass filter 23 has a bandwidth of 3.58 mHz ±0.3 mHz to allow passage of chrominance information of bandwidth $b_{CH2} = 0.286$ mHz, the chroma reference generator outputs a 5.318181 mHz reference signal, low pass filter 29 has a bandwidth $B_{CHH}$ of 0 to 2.5 mHz to allow unimpeded passage of the heterodyned chrominance information of 1.73863 ±0.286 mHz, and audio VCOs 33 and 35 operate at nominal frequencies of 0.57823419 mHz and 1.29414319 mHz, respectively. Similarly, in FIG. 2, low pass filter 81 of bandpass BP2 passes frequencies up to 3 mHz to allow clear passage of the demodulated luminance and chrominance components, low pass filter 85 has a bandwidth of 0 to 2.1 mHz, bandpass filter 97 has a bandpass $B_{CHF}$ of 1.74 mHz ±0.5 mHz to allow through passage of the new subcarrier and first order sidebands, chroma reference oscillator 95 has a frequency of 5.318181 mHz to return the chrominance signal to the 3.579545 mHz ±0.286 mHz which is subsequently passed through bandpass filter 101 having a bandpass of 3.58 mHz ±0.3 mHz.

While the invention has been particularly shown and described with reference to preferred embodiments thereof, it will be understood by those skilled in the art that changes in form and details may be made therein without departing from the spirit and scope of the invention. Accordingly, it is not intended that the invention be limited except as by the appended claims.

I claim:

1. A method for generating a compressed bandwidth frequency modulation carrier signal, relative to a full-luminance/full-color bandwidth frequency modulation carrier signal, and containing encoded signal information representing a composite color video signal and at least one audio signal, wherein a full-luminance/full-color carrier signal has an upper carrier frequency limit of $f_{max1}$, a white level carrier frequency of $f_{w1}$, a blanking level carrier frequency of $f_{b1}$, a sync tip carrier frequency of $f_{s1}$, a luminance video bandwidth $B_{L1}$, a color video bandwidth $B_{CH1}$, a nominal color carrier frequency of $f_{sc1} = 3.579$ mHz, and an audio subcarrier frequency of $f_{as1}$, said method comprising the steps of:

(a) providing a composite color video signal having a compressed luminance video component of bandwidth $B_{L2} = \frac{1}{2}B_{L1}$, a color video component of compressed bandwidth $B_{CH2}$ and nominal frequency $f_{sc2}$, and a synchronizing component consisting of horizontal and vertical synchronization pulses and a color sync burst;

(b) providing a video carrier signal having an upper carrier frequency limit $f_{max2}$, a white level carrier frequency $f_{w2}$, a blanking level carrier frequency of $f_{b2}$, and sync tip carrier frequency of $f_{s2}$;

(c) providing at least one audio frequency signal having a bandwidth $B_{a2}$;

(d) providing an audio subcarrier signal having a nominal frequency of $f_{as2}$;

(e) selecting $f_{sc2}$ by (i) maximizing the variable $B_{CH2}$ in the equation set, $$f_{sc2} - B_{CH2} \leq \tfrac{1}{2}f_{b1}$$

$$3f_{sc2} - 2B_{CH2} \leq \tfrac{1}{2}f_{w1};$$

(f) frequency modulating said video carrier signal with said composite color video signal while controlling frequency deviation to produce a frequency modulated carrier in which, $$f_{max2} = \tfrac{1}{2}f_{max1},$$

$$f_{w2} = \tfrac{1}{2}f_{w1},$$

$$f_{b2} = \tfrac{1}{2}f_{b1}, \text{ and}$$

$$f_{s2} = \tfrac{1}{2}f_{s1};$$

(g) frequency modulating said audio subcarrier with said audio frequency signal; and (h) summing the modulated video and audio carrier signals.

2. The method as claimed in claim 1, wherein: said compressed luminance video component in step (a) is derived from the NTSC standard full-luminance bandwidth value of 4.2 mHz, such that $B_{L2} = \tfrac{1}{2}B_{L1} = \tfrac{1}{2}(4.2 \text{ mHz}) = 2.1$ mHz.

3. The method as claimed in claim 1, wherein: said modulated video carrier signal of step (f) is derived from full-luminance/full-color carrier signal standard frequencies of, $$f_{max1} = 11.3 \text{ mHz},$$

$$f_{w1} = 9.3 \text{ mHz},$$

$$f_{b1} = 8.1 \text{ mHz, and}$$

$$f_{s1} = 7.6 \text{ mHz, such that from step (f)},$$

$$f_{max2} = 5.65 \text{ mHz},$$

$$f_{w2} = 4.65 \text{ mHz},$$

$$f_{b2} = 4.05 \text{ mHz, and}$$

$$f_{s2} = 3.81 \text{ mHz}.$$

4. The method as claimed in claim 1, wherein step (e) further includes selecting $f_{sc2}$ so as to satisfy the equation set, $$f_{sc2} = (2n_1 + 1)f_H/2, \text{ and}$$

$$n_1 = 455(N_1/2N_2) - 228,$$

where $f_H$ is the NTSC standard line frequency 15734.264 HZ, and $N_1$ and $N_2$ are integers.

5. The method as claimed in claim 4, wherein maximizing $B_{CH2}$ in the first equation set in step (e) with $f_{b1} = 8.1$ mHz and $f_{w1} = 9.3$ mHz, and simultaneously satisfying the second equation set in step (e), produces the single value for $f_{sc2}$ of 1.739 mHz to four significant digits.

6. The method as claimed in claim 5, wherein maximizing the value for the variable $B_{CH2}$ in step (e), with the given values of $f_{sc2}$, $f_{b1}$, and $f_{w1}$, and simultaneously satisfy the second equation set of step (e) produces said maximum value for $B_{CH2}=0.286$ mHz to three significant figures.

7. The method as claimed in claim 6, including the further step of:
selecting $f_{as2}$ to avoid interference with the relatively high level chroma carrier at $f_{sc2}$ in the baseband signal, within the range limit given for $f_{as2}$ according to the further restriction, $$f_{as2} \lessapprox f_{sc2} - B_{CH2}$$

8. A method for generating a compressed bandwidth frequency modulation carrier signal, relative to a full-luminance/full-color bandwidth frequency modulation carrier signal, and containing encoded signal information representing a composite color video signal and at least one audio signal, wherein a full-luminance/full-color carrier signal has an upper carrier frequency limit of $f_{max1}$, a white level carrier frequency of $f_{w1}$, a blanking level carrier frequency of $f_{b1}$, a sync tip carrier frequency of $f_{s1}$, a luminance video bandwidth $B_{L1}$, a color video bandwidth $B_{CH1}$, a nominal color carrier frequency of $f_{sc1}=3.579$ mHz, and an audio subcarrier frequency of $f_{as1}$, said method comprising the steps of:

(a) providing a composite color video signal having a compressed luminance video component of bandwidth $B_{L2}=\frac{1}{2}B_{L1}$, a color video component of compressed bandwidth $B_{CH2}$ and nominal frequency $f_{sc2}$, and a synchronizing component consisting of horizontal and vertical synchronization pulses and a color sync burst;

(b) providing a video carrier signal having an upper carrier frequency limit $f_{max2}$, a white level carrier frequency $f_{w2}$, a blanking level carrier frequency of $f_{b2}$, and a sync tip carrier frequency of $f_{s2}$;

(c) providing at least one audio frequency signal having a bandwidth $B_{a2}$;

(d) providing an audio subcarrier signal having a nominal frequency of $f_{as2}$;

(e) selecting $f_{sc2}$ by maximizing the variable $B_{CH2}$ in the equation, set, $$f_{sc2} + B_{CH2} \leq \tfrac{1}{2} f_{b1}$$

$$3f_{sc2} - 2B_{CH2} \geq \tfrac{1}{2} f_{w1}; \text{ and}$$

(f) selecting said at least one audio subcarrier $f_{as2}$ according to one of the equations of the equation set, $$f_{b2} - f_{sc2} - B_{CH2} \geq f_{as2} \geq f_{sc2} + B_{CH2},$$

$$0 \leq f_{as2} \lessapprox f_{b2} - 2f_{sc2}, \text{ and}$$

$$f_{sc2} - B_{CH2} \geq f_{as2} \geq f_{w2} - 2f_{sc2}$$

(g) frequency modulating said video carrier signal with said composite video signal while controlling frequency deviation to produce a frequency modulated carrier in which, $f_{max2} = \tfrac{1}{2} f_{max1}$, $f_{w2} = \tfrac{1}{2} f_{w1}$, $f_{b2} = \tfrac{1}{2} f_{b1}$, and $f_{s2} = \tfrac{1}{2} f_{s1}$;

(h) frequency modulating said at least one audio subcarrier with said audio frequency signal; and (i) summing the modulated video and audio carrier signals.

9. The method as claimed in claim 8, wherein:
said at least one audio signal is a pair of audio signals $a_1$, and $a_2$;
said at least one audio subcarrier $f_{as2}$ is a pair of audio subcarriers $f_{a1}$, and $f_{a2}$; and
each of said pair of audio subcarrier $f_{a1}$ and $f_{a2}$ is selected to satisfy a different one of the equations in step (f).

10. The method as claimed in claim 9, wherein:
$f_{a1}$ is selected to satisfy the equation, $$0 \leq f_{a1} \lessapprox f_{b2} - 2f_{sc2}; \text{ and}$$

$f_{a2}$ is selected to satisfy the equation, $$f_{sc2} - B_{CH2} \geq f_{a2} \geq f_{w2} - 2f_{sc2}.$$

11. The method as claimed in claim 10, wherein step (e) further includes selecting $f_{sc2}$ so as to satisfy the equation set, $$f_{sc2} = (2n_1 + 1) f_H/2, \text{ and}$$

$$n_1 = 455 \frac{N_1}{2N_2} - 228,$$

where
$f_H$ is the NTSC standard line frequency 15734.264 Hz, a $N_1$ and $N_2$ are integers.

12. The method as claimed in claim 11, wherein: said modulated video carrier signal of step (g) is derived from full luminance/full color carrier signal standard frequencies of, $f_{w1}=9.3$ mHz, and $f_{b1}=8.1$ mHz; such that from step (g), $f_{w2}=4.65$ mHz, and $f_{b2}=4.05$ mHz;

maximizing the first equation set in step (e) with $f_{b1}=8.1$ mHz and $f_{w1}=9.3$ mHz, and simultaneously satisfying the second equation set of step (e) produces the single value for $f_{sc2}$ of 1.739 mHz;

maximizing the value for the variable $B_{CH2}$ in step (e), with the given values of $f_{sc2}$, $f_{b1}$, and $f_{w1}$, produces said maximum value for $B_{CH2}=0.286$ mHz; and
selecting $f_{a1}$ and $f_{a2}$ by satisfying the equation set, $$0 \geq f_{a1} \lessapprox f_{b2} - 2f_{sc2}; \text{ and}$$

$$f_{sc2} - B_{CH2} \geq f_{a2} \geq f_{w2} - 2f_{sc2}$$

produces the ranges, $0 \leq f_{a1} \lessapprox 0.572$ mHz, and $1.435$ mHz $\geq f_{a2} \geq 1.172$ mHz.

13. The method as claimed in claim 12, wherein said step of selecting $f_{a1}$ and $f_{a2}$ includes the further steps of:
selecting $f_1$ according to the equation set, $$f_{a1} = \frac{Q_1}{P_1} f_{sc1} = 3.579 \frac{Q_1}{P_1} \text{ mHz}$$

$$\frac{Q_1}{P_1} = (4n_2 + 1)/910; \text{ and}$$

selecting $f_{a2}$ according to the equation set, $$f_{a2} = \frac{Q_2}{P_2} f_{sc1} = 3.579 \frac{Q_2}{P_2} \text{ mHz}$$

$$\frac{Q_2}{P_2} = (4n_3 + 3)/910,$$

where $Q_1$, $Q_2$, $P_1$, $P_2$, and $n_x$ are integers.

14. The method as claimed in claim 13, wherein, in order to eliminate the component of frequency $f_{sc1}/P$ in the frequency modulation spectrum, said step of selecting $f_{a1}$ and $f_{a2}$ further includes limiting $f_{sc1}/P$ to be above the audio range, producing the relationships, $f_{sc1}/P_1 \geq 20$ kHz, and $f_{sc1}/P_2 \geq 20$ kHz.

15. The method as claimed in claim 14 wherein said step of selecting $f_{a1}$ and $f_{a2}$ includes choosing as large a value for $Q_1$ and for $Q_2$ as possible while maintaining all other restrictions set forth.

16. The method as claimed in claim 15, wherein satisfying all of the restrictions recited for selecting $f_{a1}$ and $f_{a2}$ produces the values, $f_{a1} = 0.578$ mHz, and $f_{a2} = 1.294$ mHz, to four significant digits.

17. A method for recording audio and video information onto a recording medium having a predetermined useful frequency upper limit $f_{max}$, comprising the steps of:
(a) providing a video carrier signal;
(b) providing a composite video signal comprising a luminance video signal having a bandwidth $B_L$, and a color video signal having a predetermined nominal frequency $f_{sc2}$ and chrominance bandwidth $B_{CH2}$;
(c) providing first and second audio frequency signals $a_1$ and $a_2$;
(d) providing an audio subcarrier $f_{a1}$ for audio signal $a_1$, and an audio subcarrier $f_{a2}$ for audio signal $a_2$;
(e) frequency modulating said video carrier signal with said composite video signal to produce a carrier frequency $f_{b2}$ at blanking level of the composite video signal and to produce a carrier frequency $f_{w2}$ at white level of the composite video signal;
(f) selecting said audio subcarrier frequency $f_{a1}$ according to the relationship, $0 \leq f_{a1} \lesssim f_{b2} - 2f_{sc2}$;

(g) selecting said audio subcarrier frequency $f_{a2}$ according to the relationship, $f_{sc2} - B_{CH2} \geq f_{a2} \geq f_{w2} - 2f_{sc2}$;

(h) frequency modulating said audio subcarriers $f_{a1}$ and $f_{a2}$ with said audio frequency signals $a_1$ and $a_2$, respectively;
(i) summing said frequency modulated video and audio signals, and recording the summed signals on the recording medium.

18. The method as claimed in claim 17, including the steps of:
premphasizing the higher frequencies of said composite video signal to define $f_{max} = 5.65$ mHz.

19. The method as claimed in claim 17, including the steps of:
selecting $f_{b2} = 4.05$ mHz;
selecting $f_{w2} = 4.65$ mHz;
selecting $f_{sc2} = 1.739$ mHz; and
selecting $B_{CH2} = 0.286$ mHz; thereby determining the values $0 \leq f_{a1} \lesssim 0.572$ mHz, and $1.453$ mHz $\geq f_{a2} \geq 1.172$ mHz.

20. A method for generating a compressed bandwidth frequency modulation carrier signal, relative to a full-luminance/full-color bandwidth frequency modulation carrier signal, and containing encoded signal information representing a composite color video signal and at least one audio signal, wherein a full-luminance/full-color carrier signal has an upper carrier frequency limit of $f_{mx1}$, a white level carrier frequency of $f_{w1}$, and a blanking level carrier frequency of $f_{b1}$, said method comprising the steps of:
(a) providing a composite color video signal having a luminance video component, a color video component of compressed bandwidth $B_{CH2}$ and nominal frequency $f_{sc2}$, and a synchronizing component consisting of horizontal and vertical synchronization pulses and a color sync burst; and
(b) selecting $f_{sc2}$ by maximizing the variable $B_{CH2}$ in the equation set, $f_{sc2} + B_{CH2} \leq \frac{1}{2} f_{b1}$ $3f_{sc2} - 2B_{CH2} \geq \frac{1}{2} f_{w1}$.

* * * * *